United States Patent [19]

Chea, Jr. et al.

[11] 4,456,991
[45] Jun. 26, 1984

[54] TELEPHONE LINE CIRCUIT AND SYSTEM

[75] Inventors: Ramon C. W. Chea, Jr., Monroe; Santanu Das, Huntington; Daniel C. Upp, Southbury, all of Conn.; Jozef Cornu, Stekene, Belgium; Johan M. R. Danneels, Rupelmonde, Belgium; Jean R. J. M. Taeymans, Wilrijk, Belgium

[73] Assignee: International Telephone and Telegraph Corporation, New York, N.Y.

[21] Appl. No.: 456,638

[22] Filed: Jan. 10, 1983

Related U.S. Application Data

[63] Continuation of Ser. No. 303,457, Sep. 18, 1981.

[51] Int. Cl.³ .................. H04Q 11/04; H04M 3/00
[52] U.S. Cl. .................................. 370/58; 179/16 AA
[58] Field of Search ................ 370/58, 59, 63, 64, 370/66; 179/16 A, 18 F, 16 AA, 16 F

[56] References Cited

U.S. PATENT DOCUMENTS

| | | | |
|---|---|---|---|
| 3,617,643 | 11/1971 | Nordquist | 370/64 |
| 4,261,051 | 4/1981 | Ohnishi et al. | 370/58 |
| 4,322,843 | 3/1982 | Beuscher et al. | 370/58 |
| 4,327,436 | 4/1982 | Ohara et al. | 370/58 |
| 4,356,563 | 10/1982 | Viale | 370/58 |
| 4,370,742 | 1/1983 | Minamitani et al. | 370/58 |

Primary Examiner—Douglas W. Olms
Attorney, Agent, or Firm—John T. O'Halloran; Jeffery P. Morris

[57] ABSTRACT

A telephone line circuit and system for interfacing digital exchange line circuits to a terminal interface of a switching network is disclosed. The system includes controllable active circuit impedance matching means for reducing impedance mismatch between a selected line circuit and the terminal interface. Control means controls both the active circuit impedance matching means for adjusting the effective circuit impedance to a value within a predetermined range, and the conditioning circuit gain pads for selectably adjusting the gain of a transmitted signal. Additionally, control means controls the d.c. line impedance and voltage for adjusting the effective line feed current to the subscriber loop, and provides interfaces for a plurality of line circuits to both a switching network and external processor. Supervision means provides supervision control signals to the control means and thereby permits the telephone line circuit system to provide desired telephone system functions.

19 Claims, 5 Drawing Figures

TELEPHONE LINE CIRCUIT AND SYSTEM

This is a continuation of application Ser. No. 303,457, filed Sept. 18, 1981.

This application relates to copending U.S. application entitled, Apparatus For Regulating Current Supplied To A Telephone Line, Ser. No. 98,104, filed Nov. 28, 1979 now U.S. Pat. No. 4,315,106; Subscriber Line Interface Circuit With Impedance Synthesizer, Ser. No. 180,751, filed Aug. 25, 1980 now U.S. Pat. No. 4,387,273; and Subscriber Line Interface Circuit Utilizing Impedance Synthesizer and Shared Voltage Source For Loop Current Regulation Control, Ser. No. 189,976, filed Sept. 22, 1980 now U.S. Pat. No. 4,317,963. The disclosures of each of these copending applications are hereby expressly incorporated by reference in this application.

FIELD OF THE INVENTION

The present invention relates generally to telephone line circuits, to a system for interfacing telephone subscriber lines and trunks to a switching network and, more particularly, to a controllable interface system which provides active circuit controlled impedance matching between the terminal interface of a telephone switching system and a subscriber line circuit or group of telephone line circuits.

BACKGROUND OF THE INVENTION

Prior line circuit switching network connections have been effected on a per line basis wherein numerous dedicated switching components have been employed for each line to accomplish prespecified connection functions. These prior systems have employed special purpose relays which inherently limit the speed and versatility of the system. Moreover, these prior systems have employed compensation networks which, while decreasing the degree of mismatch also impair the signal power.

As seen for example in U.S. Pat. No. 4,161,633, microcomputers have been employed in interface circuits to effect interface supervision between a switching network and a subscriber line. However, such systems have required a plurality of separate control leads from the microcomputer to be connected to each line circuit and the individual relays to those lines. These systems also have relied on analog control signals. While such systems have provided improved capabilities, they have not yet provided a fully integrated interface system for control and information transfer.

SUMMARY OF THE INVENTION

It is an object of the present invention to provide a telephone line circuit and system for interfacing subscriber lines to a switching network.

It is a further object of the present invention to provide a controllable interface system having active circuit controlled impedance matching between the terminal interface of a telephone switching network and a subscriber line circuit or group of line circuits.

It is a further object of the present invention to provide an interface system having, a control unit having a RAM linked to an external microprocessor/computer for maintaining line status information and providing control protocols for system interface, implementation, use and supervision.

It is still a further object of the present invention to provide a controllable interface system which readily supervises a plurality of subscriber lines and interfaces these line circuits to a terminal interface of a switching network in a controlled and regulated fashion.

It is a still further object of the present invention to provide a controllable interface system which is economical to implement.

Briefly, the invention provides a controllable telephone line circuit and interface system including a control unit which interfaces to a terminal interface of a switching network at least one controllable line circuit having an active circuit feedback means for producing an approximate impedance matching between the subscriber line and the terminal interface. This controllable interface system integrates both system control and information transfer to provide a more efficient and less expensive system. Advantageously, the system is also provided with control circuitry to reduce power during non-use periods. The controllable line circuit includes one or more controllable logic circuits, which can be implemented by either digital or analog techniques, to supervise each line circuit and its relationship with a subscriber set. Some of the controllable line logic circuits regulate controllable line subcircuits, such as power or impedance networks, in response to control signals issued from a control unit. Other logic circuits issue status signals which for example characterize whether the line circuit is busy, whether a subscriber has answered the phone in response to a ring or whether the subscriber desires to initiate a call or information transfer.

The status signals produced by the subscriber line logic periodically updates a line status memory in the control unit whereby the control unit contains and has immediate on-line access to information concerning the status of each subscriber line.

Advantageously, the control unit is capable of immediately checking line status to determine whether the line is involved in an exchange of information, occupied with the incoming call notification (ringing) or whether the line is open for the receipt of an incoming call. Accordingly, the control unit can immediately and locally determine subscriber line status and institute appropriate controls signals in an on-line fashion, without investigating the actual subscriber line each time status information is required. The telephone line circuit and system of the present invention can thus either connect a subscriber line to a particular transmission line of the terminal interface or return to the terminal interface a control signal indicating the subscriber line is unavailable.

The control unit also includes an updateable system protocol memory which contains system codes and protocols useful in interfacing line circuits to a terminal interface and in providing telephone functions. These functions include activating subscriber logic to set or adjust subscriber line circuit components to attain better electrical matching between a particular subscriber line and a particular transmission line. Protocol logic control signals are also updateable in response to system testing.

In the preferred embodiment, the telephone lines circuit and system of the present invention employs a bit serial format which permits a minimum number of wires to connect a line circuit to the control unit and a terminal interface. Six wires interconnect the control unit and the line circuit as follows: control in, control out, information in, information out, meter and tone. Additionally, both the line circuit and control unit can be provided with synchronizing signals such as clock and frame signals as well as appropriate power connections. Using such signals, the control unit also operates to multiplex data received from a plurality of line circuits before sending the data to the switch network and to demultiplex data received from the network before sending it to the proper line circuit.

The present interface system is susceptible to implementation by semiconductor fabrication techniques such as large scale integration (LSI). In this manner several circuits are integrated on a single chip to reduce the size and cost of the system.

The telephone line circuit generally includes an active circuit loop having separate transmit and receive branches which interface directly with a subscriber unit. Alternating current termination impedance synthesis is attained through the active circuit loop itself. Direct current termination impedance synthesis is also implemented by an active circuit loop in combination with controllable logic which provides an effective power source for driving the d.c. line feed. The d.c. termination impedance synthesis subcircuit also advantageously includes a controllable switch for including a subscriber power source in the active loop in preference to the normally included office supply.

The telephone line circuit is advantageously provided with controllable line supervision means for detecting overcurrents, dial pulse and ring trip conditions as well as the station-ground resistance. The supervision means sends a control signal to the control unit via a conditioning circuit to update the status of the particular line circuit.

A conditioning circuit means is configured to provide a means for converting a two-wire signal to a four-wire signal, and means for converting a four-wire signal to a two-wire signal. The conditioning circuit means is also instrumental in conditioning signals arriving from and going to the active circuit loop by providing controllable means for signal balancing, filtering, attenuation and amplification.

In the preferred embodiment, a codec/filter means is provided to convert analog signals to pulse code modulated digital signals and visa versa, as well as to perform voice band filtering.

Further advantages, objects and aspects of the present invention will be apparent from the following detailed description, considered in conjunction with the attached drawings, representing the preferred embodiment of this invention, which should be construed in an illustrative and not in a limiting sense.

DETAILED DESCRIPTION OF THE DRAWINGS

Figure 1:
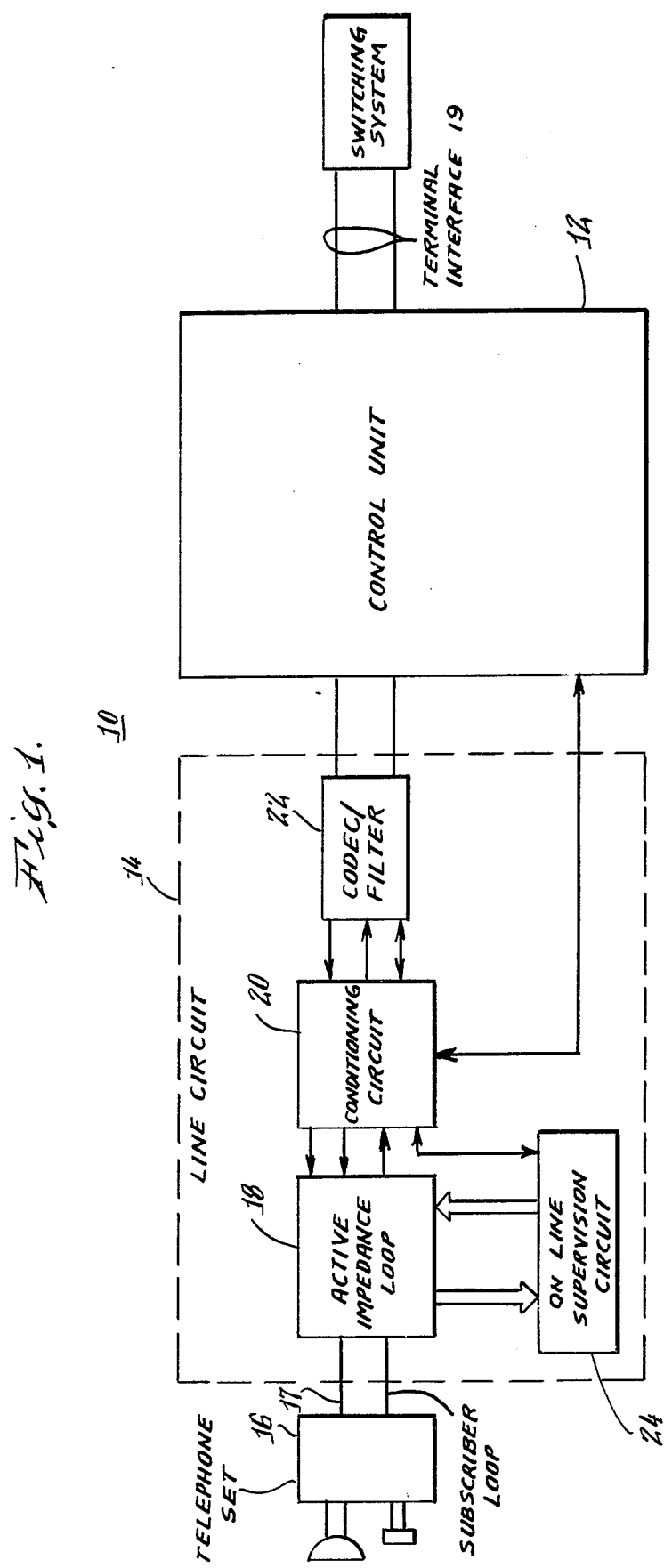
FIG. 1 is a block diagram of the telephone line circuit and system.

Referring to FIG. 1, the telephone line circuit and system is generally designated 10. It includes a control unit 12 and one or more controllable line circuits 14 connected thereto. While the maximum number of line circuits 14 which interface with a control unit 12 is determined by the customer application and production efficiencies of device fabrication, it is preferred that each control unit 12 have capacity to handle up to sixteen line circuits.

Each line circuit 14 interfaces with a subscriber set 16. Moreover, each line circuit 14 includes a controllable active loop 18 which synthesizes a desired matching impedance and thereby reduces impedance mismatch between the line circuit 14 and the terminal interface 19 of the switching network. The active circuit 18 is responsive to both d.c. and a.c. signals transmitted therethrough. The principles of a.c. and d.c, impedance synthesis which are an integral part of this invention are disclosed in the above referenced copending active circuit disclosures incorporated by reference herein.

The active impedance loop 18 of each line circuit 14 is interfaced with the control unit 12 and thus to the terminal interface of a switching system through a controllable conditioning circuit 20 and codec/filter 22. The conditioning circuit 20 prepares the received or transmitted signal for interface with the subscriber loop 17 or the terminal interface 19 of a switching system 19, by providing the signal with amplification attenuation, equalization and balancing and with 2/4 wire hybrid conversion.

The codec/filter 22 performs digital to analog and analog to digital conversions, and can be any one of a variety of commercially available devices, such as an Intel 2902, which functions to controllably and on command, translate analog and digital signals. It is preferred that the codec/filter 22 code analog signals to and decode digital signals from pulse code modulated signal format. This particular format employs a binary byte usually comprising three bits to characterize an analog signal as a combination of discrete energy levels at predetermined times. Such energy level characterization facilitates error detection and error elimination. The coded energy levels are decoded to reform an analog signal as the received signal. The codec/filter 22 also performs voice band filtering.

A line supervision circuit 24 generally provides a controllable logic means for sensing the state or condition of the active impedance loop 18 and determining the activity status of the subscriber line circuit 14. The line supervision circuit 24 permits implementation of telephony functions such as increasing the d.c. line feed current, initiating and cancelling ring signals, and detecting signal and line status information to update the system control unit.

Control unit 12 is designed to handle the control and data interfaces for up to sixteen line circuits 14 to a switching network via a terminal interface, and to an external computer/microprocessor. Thus, the interface to a microprocessor is handled by circuitry which decodes addresses and performs clock synchronization while scan circuitry reads control information and continually updates a control RAM. Likewise, the speech and data interface to the terminal interface is handled by circuitry which incorporates a loop activity RAM and a multiplexer/demultiplexer. Additionally control unit 22 is provided with features which aid in line circuit diagnostics.

On a basic level, as seen in FIG. 1, the four elements of a line circuit 14 (active impedance loop 18, line supervision circuit 24, conditioning circuit 20, and codec/filter 22) together with the control unit 12 interact to foster signal flow. In the transmit direction, a voice signal from the subscriber set 16 is sensed by the active impedance loop 18. After the preprocessing in the conditioning circuit 20 the signal is fed to the codec 22. The codec converts the continuous analog signal into a PCM digital stream which is transmitted serially to the control unit 12. The control unit 12 multiplexes the PCM data stream from each line circuit 14 connected thereto, and sends it to the terminal interface. In the receive direction, the PCM data stream is received by control unit 12 from a terminal interface. The control 12 demultiplexes the data and distributes it to the proper line circuit codec 22. The codec 22 performs a digital to analog conversion on the data which is then filtered by a low pass filter in the codec 22. The resultant signal is sent to the conditioning circuit 20 for further processing and for a 2/4 wire hybrid operation. The output is then coupled to the subscriber via the active impedance loop 18.

The status of subscriber set 16 is sensed by the active impedance loop 18. The resultant d.c. signal is fed to and processed by the line supervision circuit 24 which outputs a control signal. The control signal is sent to control unit 12 via conditioning circuit 20, and updates loop status information, such as on-hook/off-hook, ring/trip, dial pulse, and over current conditions. The loop status data is then transmitted from control unit 12 to an external microprocessor when the status information is desired.

While the basic functioning of the system has been described above, it will be appreciated that the system provides numerous desirable features and characteristics. Among the more important general telephony operation features are software selectable balance networks and gain pads, 2/4-wire hybrid, ground start, overcurrent detection, 12 or 16 KH metering with noise suppression, hardware programmable termination impedance, ring trip detection, and dial pulse detection. Other special characteristics of the system include software selectable gain mop-up pads which compensate for cumulative component tolerances, on-board multiplexing and demultiplexing of PCM data, line feed power control to reduce power dissipation, and a hittimer with software selectable values. These and other features and characteristics will be discussed below in conjunction with a more detailed description of the components of the system 10.

Figure 2:
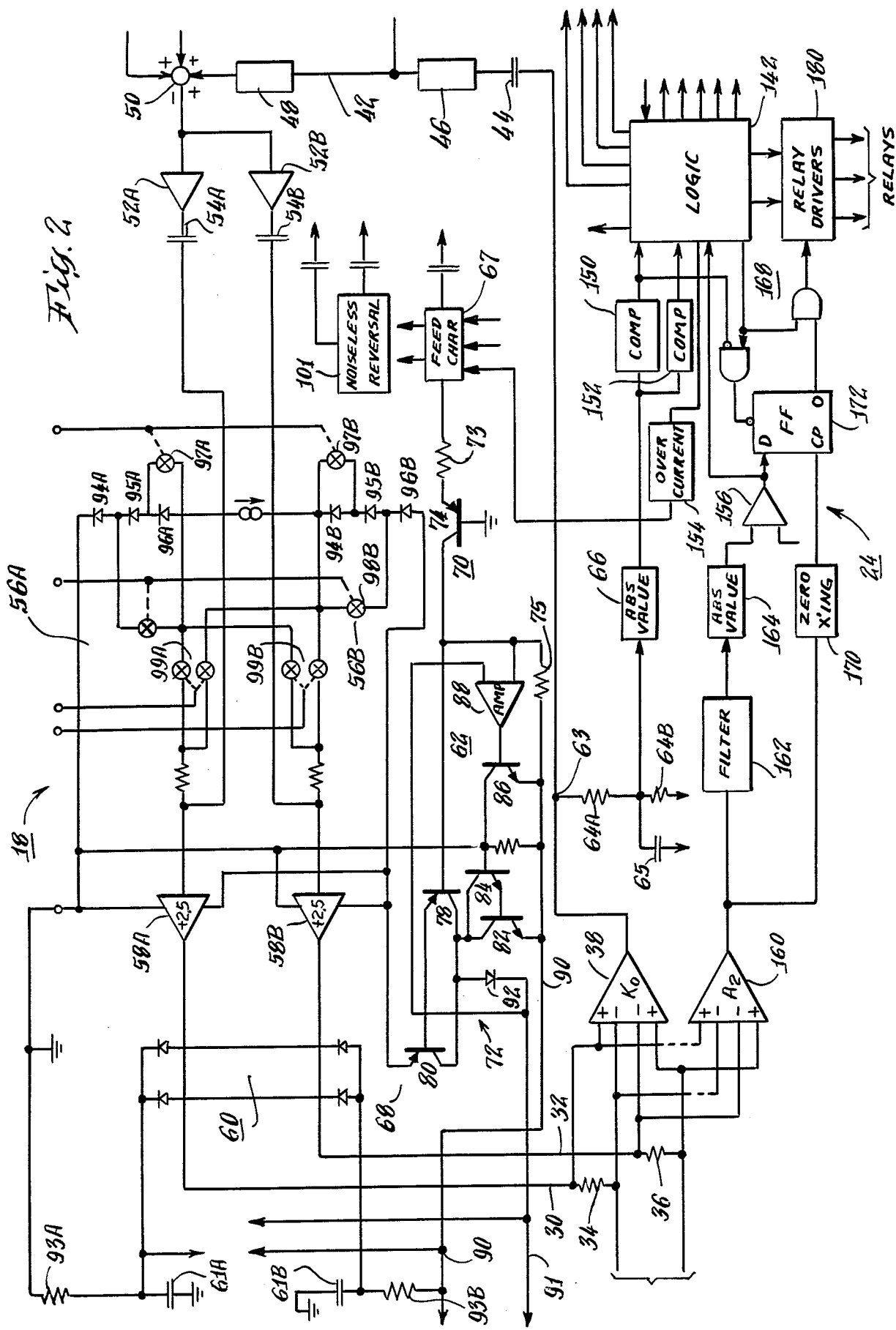
FIGS. 2 and 3 are schedmatic representations of the preferred embodiments of the controllable line circuit of the present invention.
Figure 3:
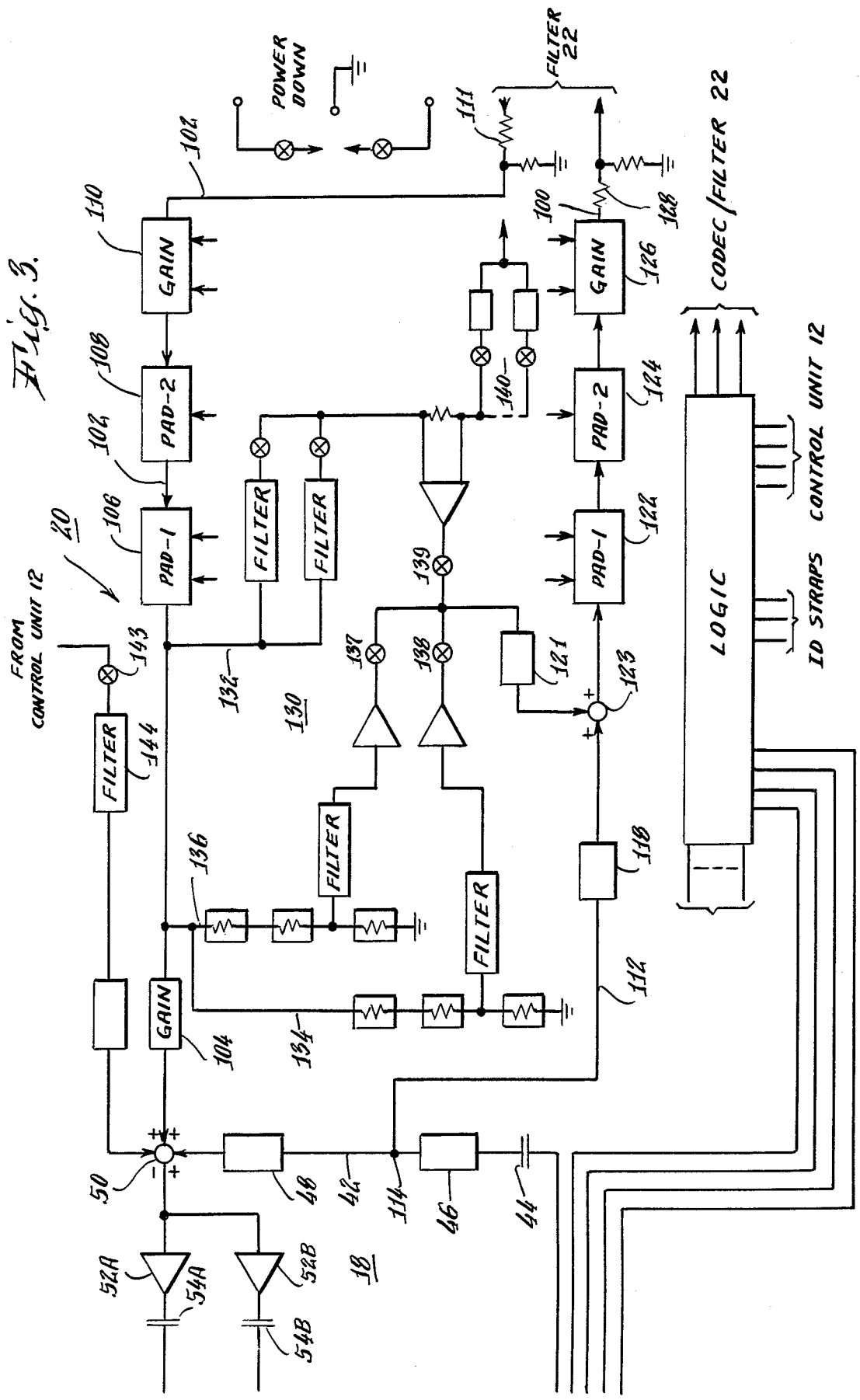

FIGS. 2 and 3 provide schematic diagrams of a portion of line circuit 14 of FIG. 1 encompassing the active circuit 18, the conditioning circuit 20, and the supervision circuit 24. Active circuit 18 generally provides a high voltage interface to the subscriber set 16, and in conjunction with the conditioning circuit 20, a sense buffer amplifier for impedance matching. As part of the high voltage interface, separate transmit and receive wires 30 and 32, each having their own line feed resistors 34 and 36 are provided.

A high input impedance, high performance differential balance sense amplifier 38 is coupled in a current differencing mode across each feed resistor 34 and 36, and produces, by high common rejection of longitudinal signals, an output signal containing a.c. and d.c. information which characterizes the subscriber load state of the feed resistors 34 and 36. The amplifier 38 senses the voltage drop across the resistors 34 and 36 which drop is proportional to the current therethrough. As is known in the art of telephony, the message or voice signal is transmitted by alternating current while line supervision and control signals are conventionally implemented by direct current.

The output of current differencing amplifier 38 is coupled through capacitor 44, gain amplifier 46, and feedback amplifier 48 to summing point 50. Amplifier 46 is selected to provide the desired termination impedance synthesis and can include RC filtering, as desired. The output from the summing point 50 is applied to the inputs of a pair of balanced drive amplifiers 58A and 58B which respectively initiate the transmit and receive for wire branches 30 and 32 of the active circuit loop 18. The gain from amplifiers 58A and 58B are preferably matched to within 1%. These amplifiers are designed to handle the d.c. line feed power requirement of the subscriber set 16 and the very high level 12 or 16 KHz remote metering signal.

The transmit path 30 includes a non-inverting drive amplifier 52A, a coupling capacitor 54A, a bias and voltage polarity circuit 56A, and a controllable drive amplifier 58A which is connected through a protection circuit 60 to feed resistor 34. The receive path includes the same elements which are designated 52B, 54B, 56B and 58B except that receive amplifier 52B is operated in an inverting mode whereas the transmit circuit amplifier 52A is operated in a non-inverting mode.

The termination impedance and feed characteristics of the line circuit are synthesized from the line feed resistors 34 and 36 by means of the active circuit feedback technique. The value of the resistors is chosen to be small, e.g. 50 ohms, to reduce power. In essence the effective termination impedance is equivalent to twice the value of the resistor multiplied by the gain of the feedback loop. The effective a.c. mode circuit voltage is similarly defined. Therefore, different termination impedance and a.c. open circuit voltages can be obtained by properly choosing the characteristics of the elements in the synthesis loop 18. The details of this technique may be found in the Chea-3 and 7 applications which has been incorporated by reference.

The bias and voltage polarity circuits 56A and 56B comprise Zener diodes 94A, 95A, and 96A, and 94B, 95B, and 96B, which establish a plurality of reference voltages values which can be selected to bias amplifiers 58A and 58B. Switches 97A, 97B, 98A and 98B control the value of the bias voltage. Switches 97A, 97B, 98A, 98B, 99A, and 99B can be operated under local control by system logic or under software control through the control unit 12.

Diode bridge 60 and coupling capacitors 61A and 61B provide high voltage transient surge protection. The diode bridge is normally reverse biased. Under surge conditions, when amplifiers 58A and 58B in the active circuit loop 18 can no longer handle the surge current, the diodes 60 conduct and gate the excessive current into the protection ground, via the capacitors 61A and 61B. Resistors 93A and 93B interconnect the capacitors 61A and 61B, respectively with the reference voltage supply to reverse bias the diode bridge 60. A signal applied through summing point 50 to either the transmit or receive branches 30 or 32 is also feedback to summing point 50 and thereby effects impedance matching. Impedance matching details may be found in the Chea-3 and 7 applications incorporated by reference herein.

The active circuit 18 can also include a d.c. line feed drive means generally designated 62 for controllably adjusting the level of the line feed current in the active circuit 18. The preferred embodiment of the line feed drive means 62, illustrated in FIG. 2, includes a d.c. synthesis loop power control circuit which is initiated at the output of differencing amplifier 38 via a tap circuit 63. Tap point 63 is connected to a voltage divider filter circuit comprising resistors 64A and 64B and filter capacitor 65. The resistors 64A and 64B are scalers which can be selected to adjust the voltage level of the tap circuit 63 to a level compatible with the selected components. Capacitors 65 primarily filters out metering signals injected as discussed below. The tap signal appearing at the output of the voltage divider filter circuit is applied to a rectifying filter circuit 66, which filters out the a.c. signal and rectifies the d.c. signal to make the d.c. synthesis loop insensitive to the direction of current flow in the subscriber line. This filter and rectified signal is applied to the input of a feed character generator 67 which includes different selectable hardware circuits for controllably effecting different signal characteristics. The feed character generator 67 can be controlled by software through the control unit or line circuit logic. The output of the feed character generator 67 is applied to control the line feed drive and switching circuit 62 which controls the drive level of amplifiers 58A and 58B.

As illustrated in FIG. 2, the line feed drive and switch circuit generally comprises a level shifter power amplifier 70 and a power switch and driver means 72.

Although the level shifter power amplifier 70 can be implemented by a variety of circuit configurations, in the illustrated preferred embodiment, transistor 74 performs as a level shifter between the current differencing amplifier 38 and the active circuit 18. The gain is determined by the ratio of the value of resistor 73 to the value of resistor 75. The emitter of transistor 74 is connected through limiting resistor 73 to the output of the controllable feed character generator 67, and its collector is connected to the base of transistor 78 which is connected in voltage follower relation with transistor 80.

The power switch and driver means 72 is comprised of a pair of switching transistors 82 and 84 which are controlled by a drive transistor 86 having its base connected to the output of a comparator 88. The collectors of switching transistors 82 and 84 are connected to the collector interconnection between voltage follower configured transistors 78 and 80 to controllably gate power from amplifier 70 to a battery return line 90. A diode 92 also connects the collector interconnection of voltage follower transistors 78 and 80 to a line power source return line 91. The switching threshold of drive transistor 86 is established by the magnitude of a resistor 75 connected between the inverting input of comparator 88 and battery return line 90. Lines 90 and 91 are designed to be independently connected to either ground or battery. Control of these connections is maintained by a microporcessor connected to control circuit 12. Thus four combination states are available under microprocessor control. The "battery reversal operation" is one of these states. The noiseless reversal block 101 is provided to suppress noise produced by this operation.

Thus it is seen that active impedance loop 18 provides a high voltage interface (diode bridge 60 and capacitor 61A and 61B) by protecting the active loop 18 from voltage surges. It also provides hardware programmable termination impedance (resistors 34 and 36, and amplifier 58A and 58B and other elements involved in feedback loop gain) as disclosed in copending application Chea-3 and 7.

Referring now to FIG. 3, information is transduced from the active circuit loop 18 by the conditioning circuit 20 having separate transmit and receive conditioning paths 100 and 102, respectively. The receive path conditioning path 102 is connected at its output end to summing point 50 and is comprised of a series connection of conditioning devices such as gain amplifier 104, controllable attenuator 106, a telephone set equalizer 108 and controllable gain mop-up amplifier 110. The input of the receive conditioning path 102 is fed from the analog output of the codec/filter 22, through current limiting resistor 111.

Figure 5:
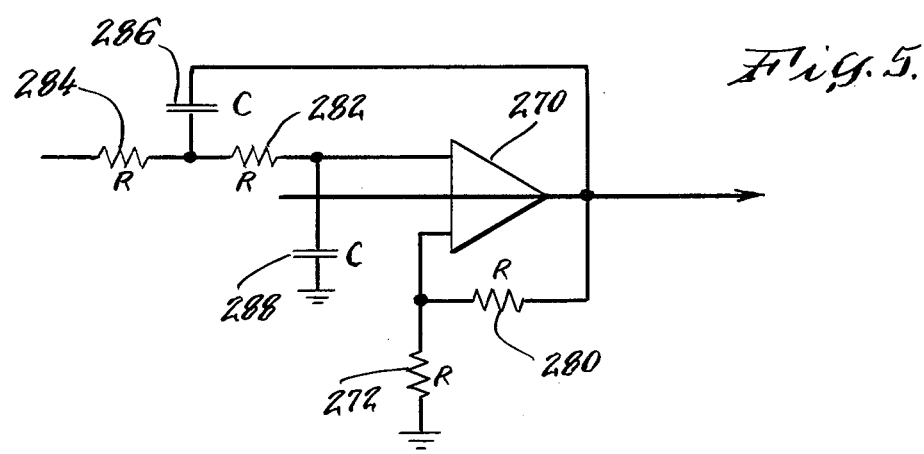
FIG. 5 is a schematic diagram of the low pass filter and amplifier in FIGS. 2 and 3.

The transmit conditioning path 100 has its input 112 connected to the active circuit 18 through a circuit tap at 114. This input signal is subjected to a balanced single ended transformation and filtering by amplifier and low pass filter 118, which is illustrated in more detail in FIG. 5. As seen in FIG. 5, filter 118 includes an amplifier 270, an offset voltage resistor 272, and a feedback resistor 280 connected to the non-inverting input terminal with scaling resistors 282 and 284, and smoothing filter capacitors 286 and 288 connected to the inverting input terminal. In this configuration amplifier 270 filters out the 12 or 16 KHz remote metering signal and acts as anti-alaising transmission filter. The transmit conditioning path 100 generally comprises a series connection of an antialaisting filter amplifier 118, controllable attenuators 122, telephone set equalizer 124, and gain mop-up amplifier 126. The output of the transmit conditioning path 110 is connected to the analog input of the codec/filter 22 through current limiting resistor 128. The controllable attenuators 106 and 122, equalizers 108 and 124 and gain amplifiers 110 and 126, are in effect gain pads and gain mop-up pads which are software selectable in both directions of transmission. These pads allow transmission gain plans to be adjusted to meet the needs of the particular market which might vary. Furthermore, the gain mop-up pads compensate for the cumulative tolerances of line circuit components. In the preferred embodiment of this invention, the overall line circuit gain is dimensioned to be slightly higher than the 0 dB value so that the introduction of the gain mop-up pads will bring it down to within specified limits. The adjustment of gain is controlled by software in the control unit 12.

Advantageously, a controllable balance network generally indicated at 130 is interconnected between the transmit and receive paths 100 and 102, for reducing echo in the transmitted signal. The balance network 130 includes three separate impedance circuits 132, 134 and, 136 having one or more discrete impedances or filters which are connected through amplifiers. The resulting signal is combined, and can be applied through an antialiasting filter 121 to the transmission path 100 at summing point 123. Each individual impedance circuit is provided with at least one serially connected and controllably activatable switch such as switches 137, 138 and 139 for open-circuiting a portion of the impedance circuit of the balance network 130. Additionally switches 140 can be provided in each impedance circuit to controllably short a predetermined impedance device and thereby controllably alter the impedance characteristic of the circuit. The balance network to be selected by the software in control unit 12 is determined by the status of the line i.e. normal operation or test mode, and the type of cable with which the line circuit is interfacing.

The impedance switches can be controlled directly from the control unit 12 or alternatively can be controlled by control signals issued from the control unit 12, which signals are combined by logic means 142 with locally generated or sensed signals to provide a line adjustment of the impedance circuit.

The conditioning circuit 20 also provides for 2/4 wire conversion wherein subscriber usage can be implemented in conventional 4 wire mode while transmission is effected in a 2 wire format. In the preferred embodiment of the present invention, 2/4 wire conversion is implemented by the bridge cancellation method. The 4 wire transmit and receive loops 30 and 32 cause signals applied to the receive loop 32 to also be applied to the transmit loop 30. In the bridge cancellation method the receive loop signal is also applied to the transmit loop via filter amplifier 121 which interconnects the receive path 102 and transmit path 100 and wherein the received signal is substracted from the transmitted signal at summation point 123 to eliminate virtual transmission signal or echo.

A hit-timer for setting the timing for ring trip and switch hook detection signals is implemented digitally in conditioning circuit 20. Depending on the value stored by the hit-timer control bits in the control RAM of control unit 12, the output of the system is delayed by a selected time interval.

Another feature of the conditioning circuit 20 is the injection of 12 or 16 KHz metering into the line circuit 14. The signal is injected into the conditioning circuit 20 at switch 143, and is filtered by filter 144 so that the noise produced by the modulation of metering injection is suppressed. The signal enters the active impedance circuit 18 by proceeding through summing point 50 and voltage amplifiers 52A and 52B to amplifiers 38 and 160 which provide the required power to the load.

The conditioning circuit 20 thus provides software selectable gain pads (106, 108, 122, 124), gain mop-up pads (110 and 126) and balance networks (130) for providing different volume levels, maintaining the consistency of those levels, and reducing echo by altering impedance characteristics of the circuit. Additionally provided by conditioning circuit 20 is the 2/4 wire hybrid, a hit-timer and 12 or 16 KHz metering.

The subscriber line circuit 14 of the present invention is also provided with a controllable line supervision means 24 to sense line conditions and generate required control signals which can be sent to the central control unit 12 via conditioning circuit 20, or locally implemented to alter the condition of the line circuit. Supervision functions include hook status and dial pulse detection, overcurrent detection, ground start, and ringing supervision.

Hook status detection indicates whether the receiver is on hook or off hook. The line supervision means 24 of the present invention provides a means for detecting the line power level to determine whether the receiver is on or off the hook. As illustrated in FIG. 2, such means for detecting can be implemented by a reference comparator 150, having its input connected to the output of current differencing amplifier 38. The decision of a valid off-hook is based on d.c. current flow in the subscriber loop. The d.c. current in the line is sensed by amplifier 38 via feed resistors 34 and 36. After scaling by resistors 64A and 64B, the output of current differencing amplifier 38 which contains both a.c. and d.c. information is fed to rectifying filter 66. The output of filter 66 is compared in the voltage reference comparator 150 to a preset voltage which corresponds to a given current in the line. Where the output of filter 66 is greater than or equal to the set value, the output of the comparator 150 activates logic 142 to correspond to the off-hook make contact state of the line. The logic signal is transmitted to the hit-timer of the conditioning circuit 20. After validation of the hit-timer the signal is sent to control unit 12. Voltage comparator 150 is preferably designed to contain hysteresis such that the transition thresholds from on-hook to off-hook and on-hook are different and independently definable. A means for dial pulse detection 152, can be similarly implemented by a comparator which detects the dial current in excess of a specified level or levels.

The present subscriber interface system also provides overcurrent protection which protects against overcurrent which can occur due to presence of foreign voltages or failure in the line circuit. Protection is provided by a comparator 154 having its input connected to the output of the rectifying filter 66, the output signal of which is proportional to the line current. The comparator 154 compares the line circuit current to a predetermined reference to produce an overcurrent warning signal if the detected current is in excess of a predetermined level. Line current can safely exceed the predetermined level during notification procedure such as ringing. Therefore, as desired, appropriate software, firmware or logic controls can be included within the system to disregard overcurrent warning signals during periods of line notification. The software, firmware or logic controls may also be used to isolate an affected line for subsequent investigation as to the cause of the overcurrent.

A ring trip detector for ringing supervision is provided as part of line supervision means 24. The detector detects current in the receive path 30 of the active circuit loop 18. The ring trip detector can be implemented by a high input impedance differential sense amplifier 160 which is used for supervision purposes and which senses current across receive branch load resistor 36 and produces an output signal. In this regard it should be noted that amplifier 160 may be connected to sense current in multi-party applications as well as single party applications. The output signal of amplifier 160 is filtered by low pass filter 162 and then by the rectifying filter 164 which extracts the dc signal. The signal is thereafter applied to a comparator detector 156 which compares the sensed and converted signals with a predetermined reference value to indicate a valid ring trip. The ring trip signal is processed by the hit-timer of the conditioning circuit 20 and is further applied to logic network 168 for system control.

The output of the sense amplifier 160 is also applied to a zero crossing detector 170, such as a reference comparator, which produces a signal comprised of a pulse train which corresponds to the zero current point of the ring current in the subscriber loop. This pulse train signal is applied to the strobe input of a DQ flip-flop 172 to strobe-in the ring/trip detection signal which is applied to the D input of the flip-flop 172. The output of the DQ flip-flop 172 can be applied through further digital combinational logic components 168 to logically combine this locally generated signal with those produced by the control unit to control the ring trip relays 180.

The line supervising means 24 is also capable of performing a ground start function. This function consists of detecting a pre-determined station resistance ground in the line 91 such as 1400 ohms maximum, and is realized by the combination of the ring trip detector, the capability of independently controlling the voltages of lines 90 and 91 as provided by active impedance circuit 18, and software action. In the idle state, line 90 is at ground and line 91 is battery voltage.

Thus, line supervision means 24 performs loop supervision including ring trip and dial pulse detection, overcurrent detection and the ground start function.

Also part of line circuit 14 is the codec/filter means 22. The codec performs, in a manner well-known the analog to digital and digital to analog conversion necessary to interface the line circuit 14 to the control unit 12. The filter performs voice band filtering to eliminate extraneous signals.

Figure 4:
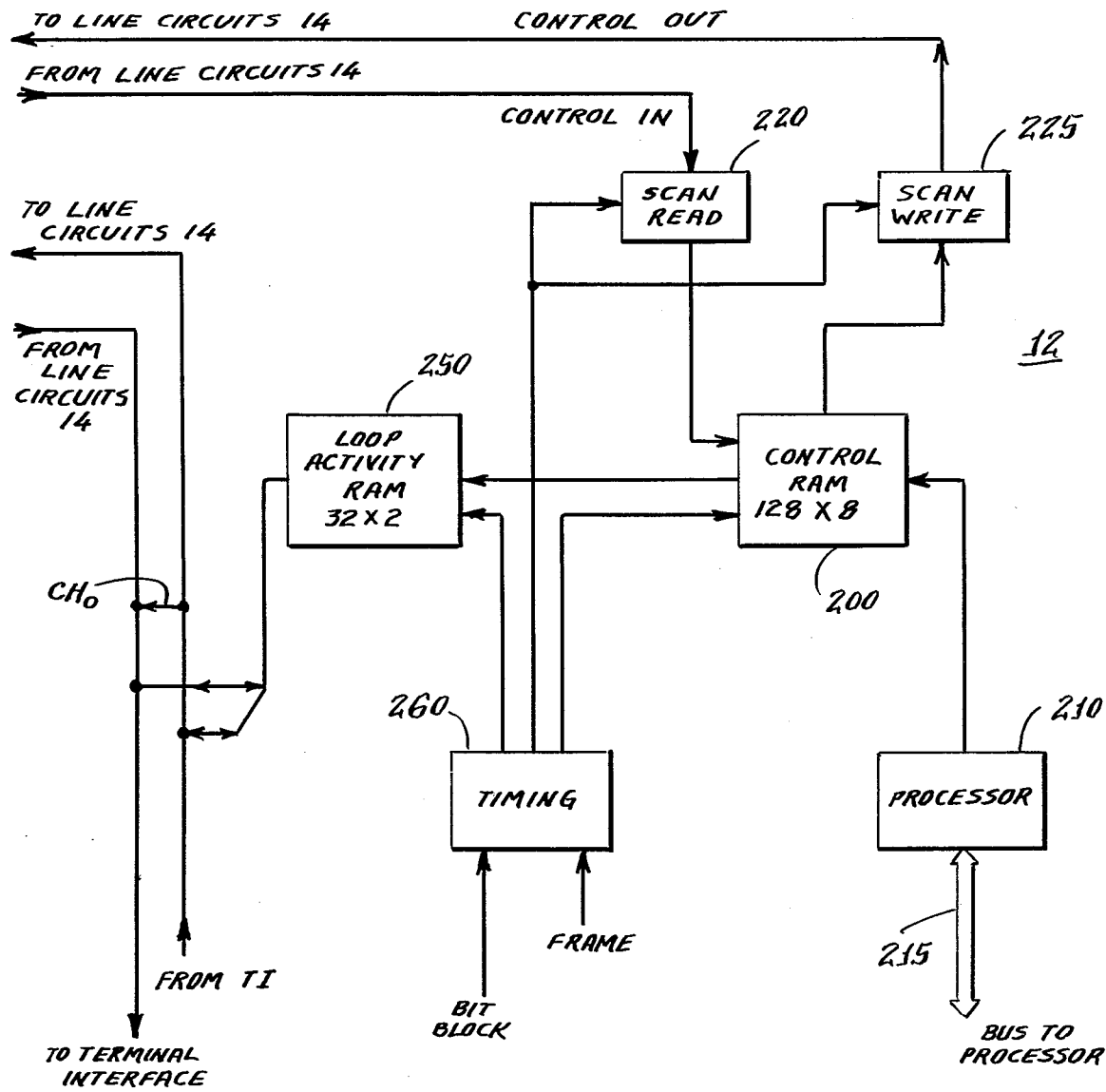
FIG. 4 is a block diagram of the control unit of the system of the present invention.

As seen in FIGS. 1 and 4, control unit 12 is a circuit designed to handle the control and data interfaces of line circuits 14 to both a processor and a terminal interface of a switching system. In interfacing line circuits 14 to a switching system, control unit 12 performs multiplexing and demultiplexing of pulse code modulated data received from the codec/filter 22.

A simplified block diagram of control unit 12 is seen in FIG. 4. Control unit 12 has four major subsections: the control, RAM 200; the RAM access circuitry, including a processor 210 and a cluster bus 215 to an external processor; the control scan circuitry 220, 225; and data input/output circuitry with associated control including loop activity RAM 200 and timing generator 260.

Control RAM 2-0 is configured as a 128×8 RAM. The 1024 byte field is split into four groups of 256 bytes. Each group is divided into eight registers of thirty-two consecutive line locations. Thus in addressing the RAM 200 a ten bit address is needed with the two most significant bits as group select. Three other bits are used for register select. Of the eight registers, Registers 0 through 6 may be read and written, while Register 7 is only read, as it is automatically updated every 125 μs with line scan information.

The three least significant bits of byte 0 (is this register 0?) are for test purposes. If they are 111, the scan points are written into byte 7 where they may be read for validation of the line circuit-control unit interface. Four bits of byte 7 are reserved for status information. The switch hook detector bit provides information about the status of subscriber loop 17. When the bit is active it indicates that the subscriber is off-hook as determined by the line supervision circuit 24. Similarly there are status bits provided for ring trip detection as well as overcurrent detection. A spare status bit could be used as a scan which in conjunction with the ring trip bit could determine which party is off hook for two party applications.

Bytes 0-4 may be used to control the various functions of the line circuit 14 and the line circuit's interface to the switching network. Thus, for example, for connecting a line circuit 14 to a terminal interface channel for the reception and transmission of pulse code modulated data, five bits are assigned. A line circuit 14 therefore can be assigned to any one of thirty-two possible channels ($2^5=32$). As for the control of the line circuit functions, the selection of a balance network of conditioning circuit 20 is controlled by the use of three control bits. Likewise, the hit-timer, which is the time delay from the detection of hook status or ring-trip until the reporting of the occurrence to software, is given its value by two bits. Another bit is used as an override to the ringing when a trouble condition occurs. The value of the gain mop-up pads of the conditioning circuit 20 are controlled by yet other bits in the control bytes. Thus, generally, any functions of the line circuit 14 described above as software controllable are controllable by bits in the control bytes of control units 12. The values contained in control RAM 200 are in turn controllable by an external processor which accesses RAM 200 via bus 215 and processor 210. Processor 210 is primarily used for address calculations which are required when RAM 200 is arranged to serve a plurality of line cards which each serve up to sixteen line circuits 14.

Loop activity RAM 250 is configured as a 32×2 RAM, and has the function of controlling the output of control unit 12 going to the terminal interface 19 and switching network. One bit is set if the corresponding numbered channel is active. The other is set if that channel is to be looped back from the terminal interface to the terminal interface with the speech unchanged. Channel 0 always has its activity and loop-back bits set and hence is always active and looped back. The RAM 250 is synchronously updated by information from control RAM 200 which in turn receives control data from supervision circuit 24 and may also receive instructions regarding channel activity from an external processor as described above.

Scan circuits, such as scan read 220 and scan write 225 which act as the control signal interface between line circuits, 14 and control RAM 200, handle information transfer. They are aided in this transfer by timing generator 260 which permits synchronization of control unit 12 with its line circuits, terminal interface, and external processor interface. Additionally, timing generator 260 aids control unit 12 in multiplexing speech data received from line circuits 14 and being sent to the terminal interface. The control unit 12, with the assistance of external circuitry also supplies line circuits 14 with a 12 or 16 KH metering sine wave signal.

Thus, it is seen that control unit 12 provides control and data interfaces for interfacing line circuits 14 to a terminal interface and an external processor. The data interface multiplexes speech and dais able to properly connect a terminal interface channel to a line circuit. The control RAM 200 interfaces with the line supervision circuit 24 and thus is capable of immediately checking line status. Control RAM 200 also provides control for the conditioning cricuit's ability to amplify, attenuate and balance incoming signals. Additionally, RAM 200 interfaces with an external processor which can change the parameters stored in the RAM 250.

It will be appreciated that although the line circuit 14 has been illustrated and discussed as consisting of many components, and control unit 12 has been described as containing various blocks, the entire system may be implemented on LSIs with some discrete components to supplement control unit 12. The active impedance loop 18 can be recognized on a custom integrated circuit and a hybrid single-in-line package, the conditioning circuit 20 and the line supervision circuit 24 each on a custom 28-pin DIP, the codec on a standard 18-pin DIP, and the control unit 12 on a standard 40-pin DIP.

The present invention provides a practical interface system which readily connects a subscriber line to the terminal interface of a switching network, and which is adaptable to a number of different line circuit applications. While it is recognized that integrated circuit fabrication may require that certain circuit parameters such as trip thresholds or reference voltages be prespecified or defined, it is within the scope of the invention to define circuit parameters to accommodate a plurality of applications. Accordingly, the feed characteristics, dial pulse thresholds, ring/trip thresholds, noise suppression, termination impedance, transmission gains, balance networks, metering signal levels, and on line voltage levels, among other functions, can be adjusted to meet subscriber needs.

Additionally, while the preferred embodiment of the invention has been disclosed in a current feedback mode of operation, a voltage control mode of line circuit operation as disclosed in the aforementioned copending applications is equally possible.

It should be understood by those skilled in the art that various modifications may be made without departing from the spirit and scope of this invention, as described in the specifications and defined in the appended claims.

What is claimed is:

1. A telephone system for providing a plurality of telephone line functions for a subscriber line, comprising a telephone line circuit including
    a controllable active circuit loop for providing a high voltage interface to said subscriber line, and for providing impedance matching means which reduces the power dissapation of said telephone line circuit and reduces the impedance mismatch between said line circuit and a terminal interface;
    a line supervision means for sensing the state or condition of said active circuit loop, and for determining the activity status of said telephone line circuit, said supervision means having controllable logic means for generating control signals for transfer to a control unit in response to the condition of said active circuit and the status of said telephone line circuit,
    a codec and filtering means for performing digital to analog, and analog to digital conversions, and for performing voice band filtering,
    a controllable conditioning circuit for preparing signals coupled thereto from said codec and filter means for interface to said subscriber line and also for preparing signals coupled thereto from said active circuit loop for transmission from said conditioning circuit to a terminal interface by providing two to four wire hybrid conversion, and signal amplification, attenuation, equalization and balancing, and
    a control means for controlling said controllable active circuit loop, said controllable conditioning means and said controllable logic means of said line supervision means, and for providing interfaces from a plurality of line circuits to both a switching network and an external processor.

2. A telephone system in accordance with claim 1 wherein:
    said codec and filter means converts analog signals to pulse code modulated digital signals.

3. A telephone system in accordance with claim 1 wherein:
    said line supervision means includes a rectifying filter, the input of which is connected to a current differencing amplifier via scaling resistors, and a voltage reference comparator connected to the output of said rectifying filter, for determining overcurrent conditions.

4. A telephone system in accordance with claim 3 wherein:
    said line supervision means includes a rectifying filter, the input of which is connected to a current differencing amplifier via scaling resistors, and a second voltage reference comparator connected to the output of said rectifying filter, for determining hook status.

5. A telephone system in accordance with claim 1 wherein:
    said line supervision means includes a low pass filter, the input of which is connected to the output of a high input impedance differential amplifier, a rectifying filter connected to the output of said low pass filter, and a comparator connected to the output of said rectifying filter, for indicating a valid ring trip.

6. A telephone system in accordance with claim 4 wherein:
    said second voltage reference comparator in designed to contain hysteresis such that the transition threshold from on-hook to off-hook and off-hook to on-hook are different and independently definable.

7. A telephone system in accordance with claim 1 wherein:
    said conditioning circuit includes gain mop up pads for compensating for the cumulative tolerances of the telephone system components.

8. A telephone system in accordance with claim 1 wherein:
    said conditioning circuit includes a controllable balance network for reducing echoing by altering the impedance characteristic of the circuit, said network comprising a plurality of impedance or filter circuits which are controllably activatible by switches.

9. A telephone system in accordance with claim 1 wherein:
    said conditioning circuit includes software selectable gain pads for allowing gain pads to be adjusted to meet various needs.

10. A telephone system in accordance with claim 1 wherein:
    said conditioning circuit provides for two to four wire conversion through a bridge cancellation means.

11. A telephone system in accordance with claim 5 wherein:
    said conditioning circuit includes a digitally implemented hit timer for setting the timing for the ring trip and hook status signals received from said line supervision means.

12. A telephone system in accordance with claim 1 wherein:
    said conditioning circuit introduces high frequency metering into said telephone line circuit, and includes a filter for suppression of unwanted audible noise on introduction of said high frequency metering.

13. A telephone system in accordance with claim 1 wherein:
    said controllable active circuit includes a diode bridge coupled to capacitors, and resistors which interconnect the capacitors to a reference voltage supply to thereby reverse bias the diode bridge, for high voltage transient surge protection.

14. A telephone system in accordance with claim 1 wherein:
said control means includes a control RAM, RAM access circuitry, control scan circuitry, and data input-output circuitry.

15. A telephone system in accordance with claim 14 wherein:
said conditioning circuit includes controllable gain pads and gain mop-up pads, a controllable balance network, and a hit-timer; and
said control RAM controls the values and functioning of the gain pads and gain mop-up pads, the switching for the balance network and the timing for the hit-timer.

16. A telephone system in accordance with claim 14 wherein:
said RAM access circuitry includes a processor for address calculations necessary to access said control RAM and a cluster bus for interfacing with an external processor which can control said control RAM.

17. A telephone system in accordance with claim 14 wherein:
said data input-output circuitry includes a multiplexer/demultiplexer for handling the data of a plurality of line circuits, and a loop activity RAM for controlling the flow of speech and data information between said line circuits and the terminal interface.

18. A telephone system in accordance with claim 17 wherein:
the control signals that the line supervision means has generated in response to the status of said telephone line circuit are continually sent to said control RAM to update said control RAM; and
said control RAM synchronously updates said loop activity RAM when receiving control data from said supervision means.

19. A telephone system in accordance with claim 1 wherein said high voltage interface to the subscriber line includes a pair of operational amplifiers operating in push-pull and having a bias which is variable under external control whereby power dissipation is reduced.

* * * * *